US010275159B2

(12) United States Patent
Huang et al.

(10) Patent No.: US 10,275,159 B2
(45) Date of Patent: Apr. 30, 2019

(54) EMBEDDED DEVICE, RAM DISK OF EMBEDDED DEVICE AND METHOD OF ACCESSING RAM DISK OF EMBEDDED DEVICE

(71) Applicant: MStar Semiconductor, Inc., Hsinchu Hsien (TW)

(72) Inventors: Chien-Hsing Huang, Hsinchu Hsien (TW); Hsin-Hsiung Tseng, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 912 days.

(21) Appl. No.: 14/688,059

(22) Filed: Apr. 16, 2015

(65) Prior Publication Data
US 2015/0301750 A1    Oct. 22, 2015

(30) Foreign Application Priority Data

Apr. 17, 2014    (TW) .............................. 103114010 A (51) Int. Cl.
G06F 3/00    (2006.01)
G06F 3/06    (2006.01)

(52) U.S. Cl.
CPC ............ G06F 3/061 (2013.01); G06F 3/0664 (2013.01); G06F 3/0673 (2013.01)

(58) Field of Classification Search
None
See application file for complete search history.

(56) References Cited

U.S. PATENT DOCUMENTS 9,645,841 B2 * 5/2017 Ayanam ............... G06F 9/45558
2010/0161893 A1 * 6/2010 Cheong ................... G06F 3/061
711/104

FOREIGN PATENT DOCUMENTS

TW    201337763 A    9/2013

OTHER PUBLICATIONS

Taiwan Office Action, dated Aug. 19, 2015, 12 pages.

* cited by examiner

*Primary Examiner* — Midys Rojas
(74) *Attorney, Agent, or Firm* — McClure, Qualey & Rodack, LLP (57) ABSTRACT

An embedded device, a RAM disk of an embedded device and a method of accessing a RAM disk of an embedded device are provided. The embedded device includes: a processing unit, configured to execute an operating system; a first memory, for the processing unit to access required system data when the processing unit executes the operating system; a function module, configured to perform a predetermined function; a second memory, for the function module to access required functional data through direct memory access when the function module performs the predetermined function; and a RAM disk driving module, configured to incorporate a first part of the first memory with the second memory to one RAM disk, and to control access of the RAM disk.

16 Claims, 7 Drawing Sheets

EMBEDDED DEVICE, RAM DISK OF EMBEDDED DEVICE AND METHOD OF ACCESSING RAM DISK OF EMBEDDED DEVICE

This application claims the benefit of Taiwan application Serial No. 103114010, filed Apr. 17, 2014, the subject matter of which is incorporated herein by reference.

BACKGROUND OF THE INVENTION

Field of the Invention

The invention relates in general to a storage unit of an embedded device and a method of accessing the storage unit, and more particularly, to a RAM disk of an embedded device and a method of accessing the RAM disk.

Description of the Related Art

Generally speaking, an embedded system frequently adopts a processor with lower performance, a smaller system memory and a smaller storage unit in order to be cost-effective. With such limited hardware resources, designers strive to fully utilize various resources. One embedded device usually includes a system memory that can be directly accessed by a processor, and a module memory (i.e., hardware IP memory) exclusive to a predetermined function module of the embedded system. For example, the system memory is a dynamic random access memory (DRAM). For example, in a smart television, the processor accesses program codes and data in the system memory to execute an operating system of the smart television, whereas a demodulation module (i.e., the above function module) includes an exclusive module memory for storing program codes that the demodulation module requires when executing the demodulation function. The module memory is exclusive to the dedicated function module, and cannot be directly accessed by the processor. When the demodulation module is in an idle state (e.g., when the smart television is used to browse web pages), the module memory is in equivalence wasted.

Some embedded systems utilize a so-called RAM disk technology to simulate an additional storage space from an idle memory to fully utilize system resources. Assuming that an embedded system includes an idle first function module (that accesses a first module memory to complete its function) and a second function module (that accesses a second module memory to complete its function), a RAM disk driving module of the embedded system respectively simulates a first RAM disk and a second RAM disk from the first module memory and the second module memory, and mounts the simulated first and second RAM disks to an operating system of the embedded system to increase system resources. For example, when the system memory is insufficient, the operating system may swap a process that is not being executed to the RAM disk to spare more system memory for processes that are being executed. The RAM disk driving module executes one driver on each of the first RAM disk and the second RAM disk. Each of the drivers includes a page table for managing the corresponding RAM disk, and so the RAM disk driving module includes a first page table corresponding to the first RAM disk and a second page table corresponding to the second RAM disk. However, the above storage method suffers from following drawbacks. First of all, the storage space cannot be utilized in an integrated manner, such that fragmented storage blocks in each of the RAM disks cannot be efficiently utilized. Secondly, when the function module enters a working state from an idle state, the RAM disk simulated from the corresponding module memory needs to be unmounted from the operating system; when the function module again returns to an idle state, the operating system needs to re-mount the corresponding RAM disk, leading to unsatisfactory execution efficiency. Thirdly, in the event that the RAM disk storages compressed system memory data, the unmounting process of the RAM disk needs decompress the compressed data into decompressed data and temporarily store the decompressed data to the system memory (as the system memory cannot store compressed data), and then compress the data and store the compressed data to another RAM disk. With a limited system memory, temporarily storing the decompressed data to the system memory may cause a large impact on the system memory, and may even lead to out of memory (OOM) situations for the operating system in more severe cases.

SUMMARY OF THE INVENTION

In view of drawbacks of the prior art, it is an object of the present invention to provide an embedded system, a RAM disk of an embedded system, and a method of accessing a RAM disk of an embedded system to enhance utilization efficiency of hardware resources of an embedded device.

The present invention discloses an embedded device. The embedded device includes: a processing unit, configured to execute an operating system; a first memory, for the processing unit to access required system data when the processing unit executes the operating system; a function module, configured to perform a predetermined function; a second memory, for the function module to access required functional data through direct memory access (DMA) when the function module performs the predetermined function; and a RAM disk driving module, configured to incorporate a first part of the first memory with the second memory into one RAM disk, and to control access of the RAM disk.

The present invention further discloses a method of accessing a RAM disk of an embedded device. The embedded device includes a function module, and a processing module configured to execute an operating system. The method includes: providing a first memory for storing system data that the processor requires when executing the operating system; providing a second memory for the function module to access functional data that the function module requires through DMA when performing a predetermined function; and incorporating a part of the first memory with the second memory into a RAM disk; and controlling access of the RAM disk.

The present invention further discloses a RAM disk of an embedded device. The embedded device operates an operating system. The RAM disk includes: a part of a system memory, the system memory configured to store system data required for operating the operating system; and a module memory of a function module of the embedded device, the function module configured to access the memory module through DMA when performing a function thereof. As far as the operating system is concerned, the RAM disk is one single storage device.

The embedded device, the RAM disk of an embedded device and the method of accessing a RAM disk of an embedded device of the present invention are capable of incorporating different memories into one single RAM disk to more effective utilize the RAM disk simulated from these memories. Compared to the prior art, when a part of the RAM disk stores compressed data, instead of first being decompressed and relocated as a function module corresponding to the first module memory enters a working state from an idle state, the compressed data stored in a first memory module memory can be directly relocated in a compressed form to another space in the RAM disk (e.g., simulated from a second module memory or a system memory), thereby reducing the impact on the system memory.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses an embedded device, a RAM disk of an embedded device and a method of accessing a RAM memory of an embedded device capable of more effectively utilizing hardware resources of an embedded device. In possible implementation, one skilled person in the art may choose equivalent devices or steps to implement the disclosure based on the disclosure of the application. That is, the implementation of the disclosure is not limited in the embodiments described in the disclosure. Further, a part of the elements included in the embedded device of the disclosure may be individually known. Without affecting the full disclosure and possible implementation of the device of the electrode design pattern, the known details are omitted. Further, the method of accessing a RAM disk of an embedded memory of the present invention may be implemented by the embedded device of the disclosure or an equivalent device. Without affecting full disclosure and possible implementation of the method, details of the method focus on steps instead of hardware.

Figure 1:
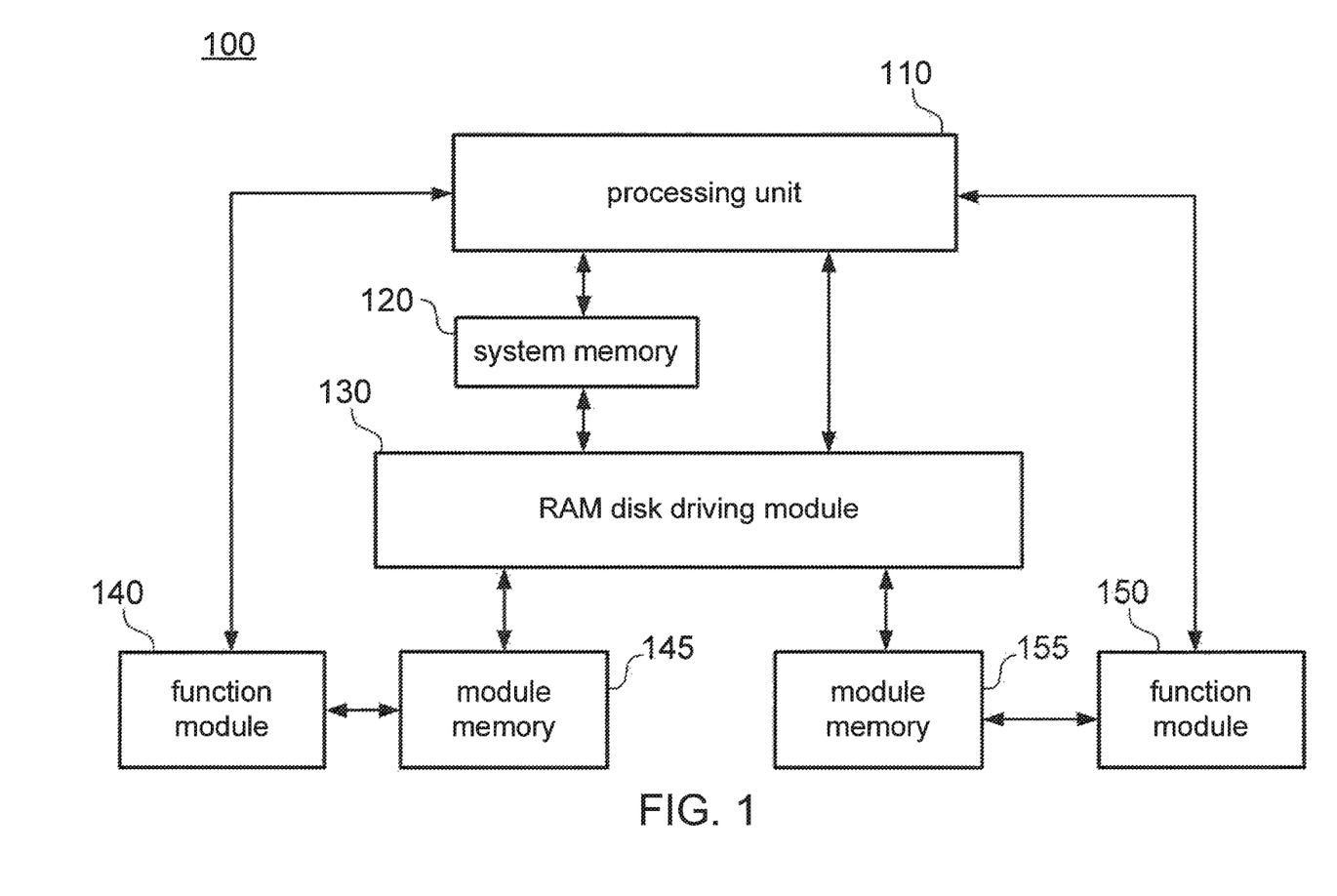
FIG. 1 is a schematic diagram of an embedded device according to an embodiment of the present invention.

FIG. 1 shows a schematic diagram of an embedded device according to an embodiment of the present invention. An embedded device 100 includes a processing unit 110, a system memory 120, a RAM disk driving module 130, a function module 140, a module memory 145, a function module 150 and a module memory 155. The processing unit 110 is in charge of executing an operating system of the embedded device 100, and the program codes and data associated with the operating system are stored in the system memory 120. The processing unit 110 converts a physical address of the system memory 120 to a logical address through a memory management unit (MMU, not shown), and accesses the system memory 120 according to the logical address. The RAM disk driving module 130, coupled to the processing unit 110 and the system memory 120, manages and drives a RAM disk of the embedded system 100. The processing unit 110 is capable operating a driver of the RAM disk driving module 130 through the operating system to access the RAM disk. The function modules 140 and 150 are in charge of processing predetermined functions of the embedded system 100. For example, assuming the embedded system is a smart television that supports television broadcasting and Internet browsing functions, the function module 140 may then be a module that demodulates television signals, and the function module 150 may be a module that performs the Internet function. The function modules 140 and 150 have respective module memories 145 and 155. The module memory 145 stores program codes and data that the function module 140 requires for operations, and the module memory 155 stores program codes and data that the function module 150 requires for operations. The module memories 145 and 155 are formed by a plurality of memory units having consecutive physical addresses, and may correspond to different sections of a same hardware memory or respectively correspond to independent hardware memory modules. The module memories 145 and 155 are exclusive memories of the function modules 140 and 150. When accessing the respective module memories 145 and 155, instead of going through the processing unit 110, the function modules 140 and 150 respectively access the module memories 145 and 150 through direct memory access (DMA) based on the physical addresses of the module memories 145 and 155. The module memories 145 and 155 cannot be directly utilized by the processing unit 110 of the embedded system 100. That is to say, when the processing unit 110 executes the operating system of the embedded system 100, even if the system memory 120 is fully occupied by processes and data, the processing unit 110 still does not utilize the module memories 145 and 155 to directly store program codes and data associated with the processes.

Figure 2:
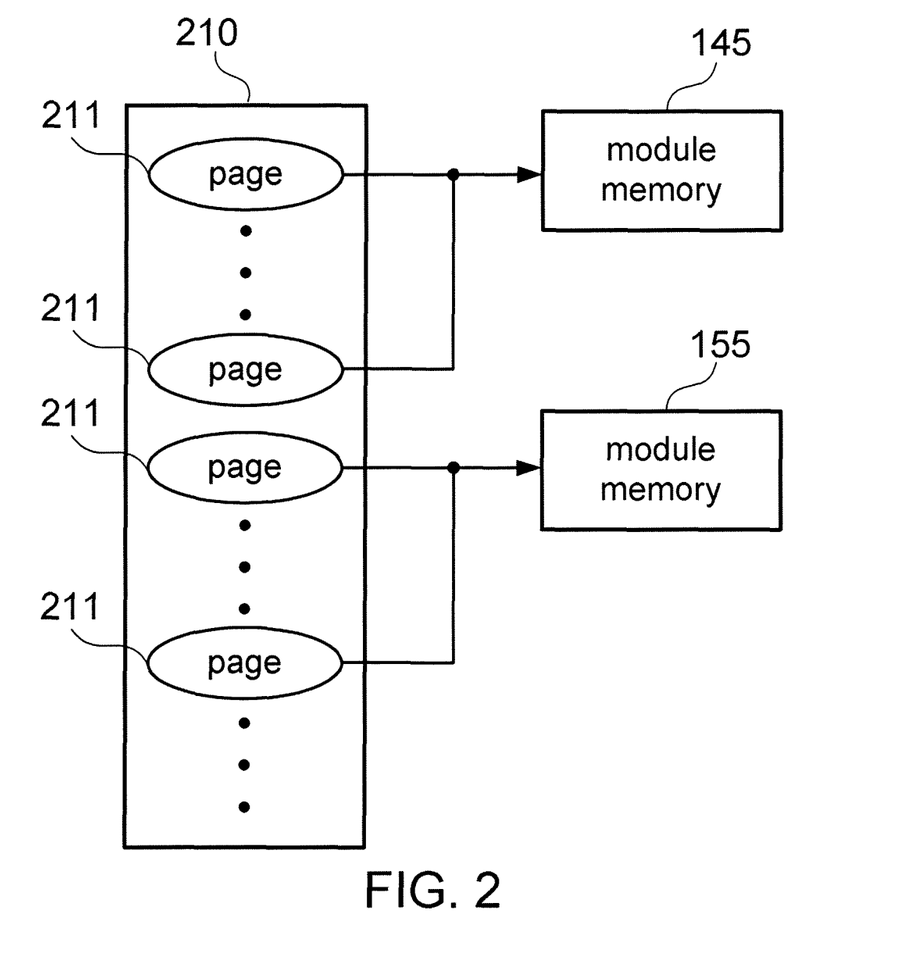
FIG. 2 is a mapping diagram of a page table and module memories according to an embodiment of the present invention.

In a preferred embodiment of the present invention, when the function modules 140 and 150 are not in a working state (i.e., in an idle state), and the module memories 145 and 155 are also in an idle state, the processing unit 110 notifies the RAM disk driving module 130 to update or manage corresponding page tables according to the working state or the idle state of the function modules 140 and 150, so as to adaptively simulate a RAM disk from the module memory 145 and/or the module memory 155. When the function modules 140 and 150 are both in an idle state, the RAM disk driving module 130 drives the module memories 145 and 144 using the same driver and according to the same page table to simulate a RAM disk of the embedded device 100 from the two. Thus, when the processing unit 110 operates the driver of the RAM disk driving module 130 through the operating system to access the RAM disk simulated from the module memories 145 and 155, only one single consecutive RAM disk is observed. That is to say, for the operating system of the embedded device 100, the RAM disk simulated from the module memories 145 and 155 is one single hardware device, and the operating system only needs to operate the corresponding device file in order to access the RAM disk. FIG. 2 shows a mapping diagram of a page table and module memories according to an embodiment of the present invention. A page table 210 includes a plurality of pages 211 that provide correspondence between logical addresses and physical addresses of the RAM disk. Thus, when the processing unit 110 accesses the RAM disk, operations are in fact performed based on the logical addresses through the MMU. Assuming that a storage space of the module memory 145 is 20 MB (about $2 \times 10^7$ bytes) and one page is 4 KB (about $4 \times 10^3$ bytes), the module memory 145 corresponds to 5000 page 211, and the MMU of the processing unit 110 accesses the data stored in the module memory 145 according to the pages 211. Because the RAM disk driving module 130 accesses the module memories 145 and 155 through the same driver and according to the same page table 210, as far as the operating system of the embedded system 100 is concerned, the RAM disk contributed by the module memories 145 and 155 is one single consecutive storage unit. Thus, there are no fragmented storage spaces and no waste in storage space is caused.

Figure 3:
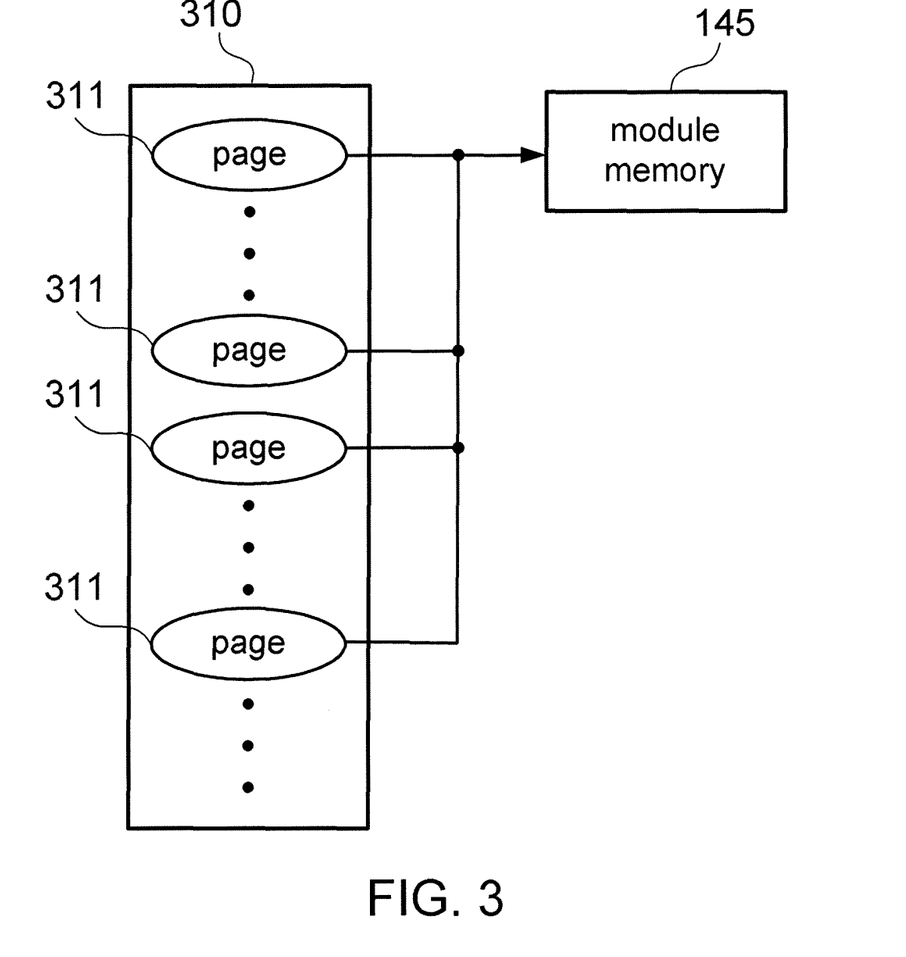
FIG. 3 is a mapping diagram of a page table and module memories according to another embodiment of the present invention.

When the embedded device 100 receives an external control signal and changes its operating mode, e.g., when the smart television switches from originally receiving video/audio signals from an external DVD player through High Definition Multimedia Interface (HDMI) to an Internet browsing mode, the module memory 155 of a network function module originally in an idle state needs to enter a working state. At this point, the RAM disk driving module 130 transfers the data in the module memory 155 to the module memory 145, and changes contents of the page table 210, i.e., changing the page from originally pointing to the module memory 155 to pointing to the module memory 145, with the updated page table as shown in FIG. 3. As such, as far as the operating system is concerned, only the storage space of the RAM disk is changed (from originally being formed by the module memories 145 and 155 to being independently formed by the module memory 145), and so the access of the RAM disk is not affected. Similarly, when another module memory of the embedded system 100 changes from a working state to an idle state, the module memory newly become idle may also be added to the RAM disk through updating the page table 210 or 310, so as to enlarge the space of the RAM disk simulated from the module memories. That is to say, when the module memory enters/exits the RAM disk, the RAM disk driving module 130 is not required to mount/unmount the RAM disk but only needs to modify the page table, hence significantly enhancing operation flexibilities of the embedded system 100.

The above RAM disk may serve as an auxiliary storage space when the operating system performs a swapping procedure. That is, when the system memory 120 is full, the operating system may relocate an idle process to the RAM disk to spare more space for processes currently being executed. When the operating system needs more space for the system memory 120, in the swapping procedure, the processing unit 110 first compresses the data to be stored to the RAM disk, and swaps more data from the system memory 120 to the RAM disk. In the embodiment, when the module memory 155 stores compressed data and the function module 150 enters a working state from an idle state, unmounting of the RAM disk is not needed. Thus, the RAM disk 130 is not required to perform complex procedures of decompressing the compressed data in the module memory 155, storing the decompressed data to the system memory 120, recompressing the decompressed data, and storing the recompressed data to the module memory 145. It should be noted that, the above complex procedures cause an impact of a large amount of data on the system memory 120. In contrast, the RAM disk driving module 130 only needs to directly relocate the compressed data in the module 155 to the module memory 145 and update the page table, such that the page originally pointing the module memory 155 is changed to point to the module memory 145, as shown by the correspondence between the page table 310 and the module memory 145 in FIG. 3. At this point, the module memory 155 has entered a working state, and the RAM disk includes only the module memory 145.

Figure 4:
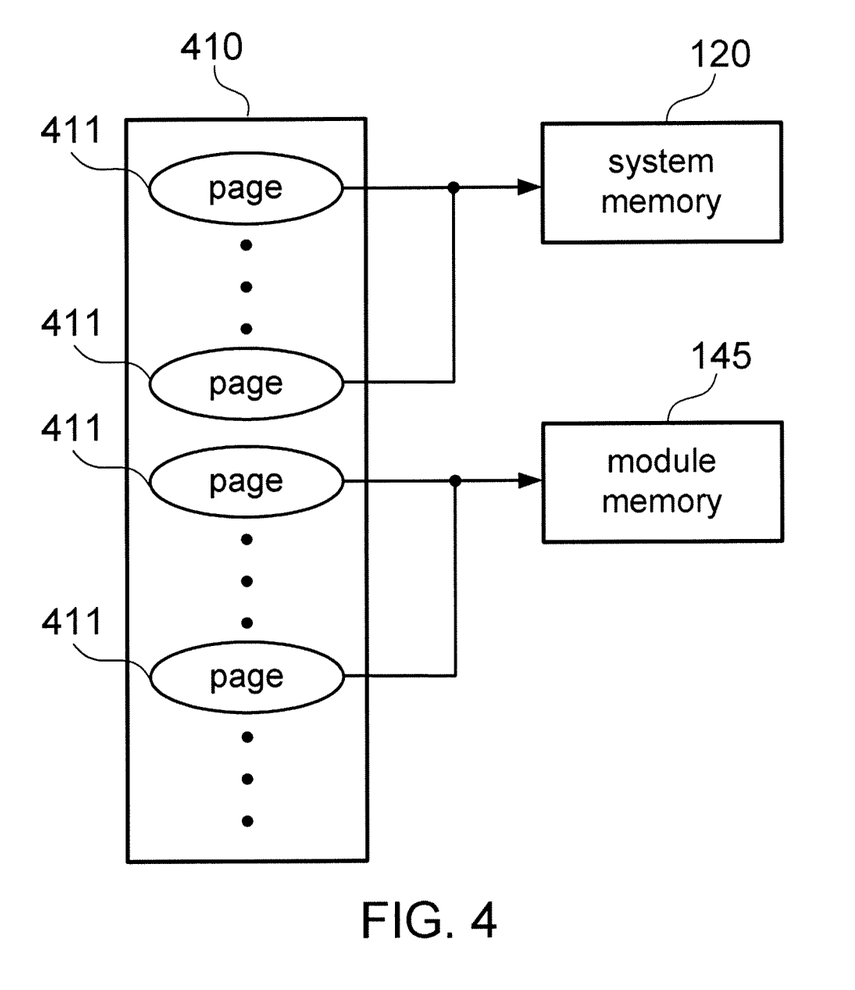
FIG. 4 is a mapping diagram of a page table and memories according to another embodiment of the present invention.
Figure 5:
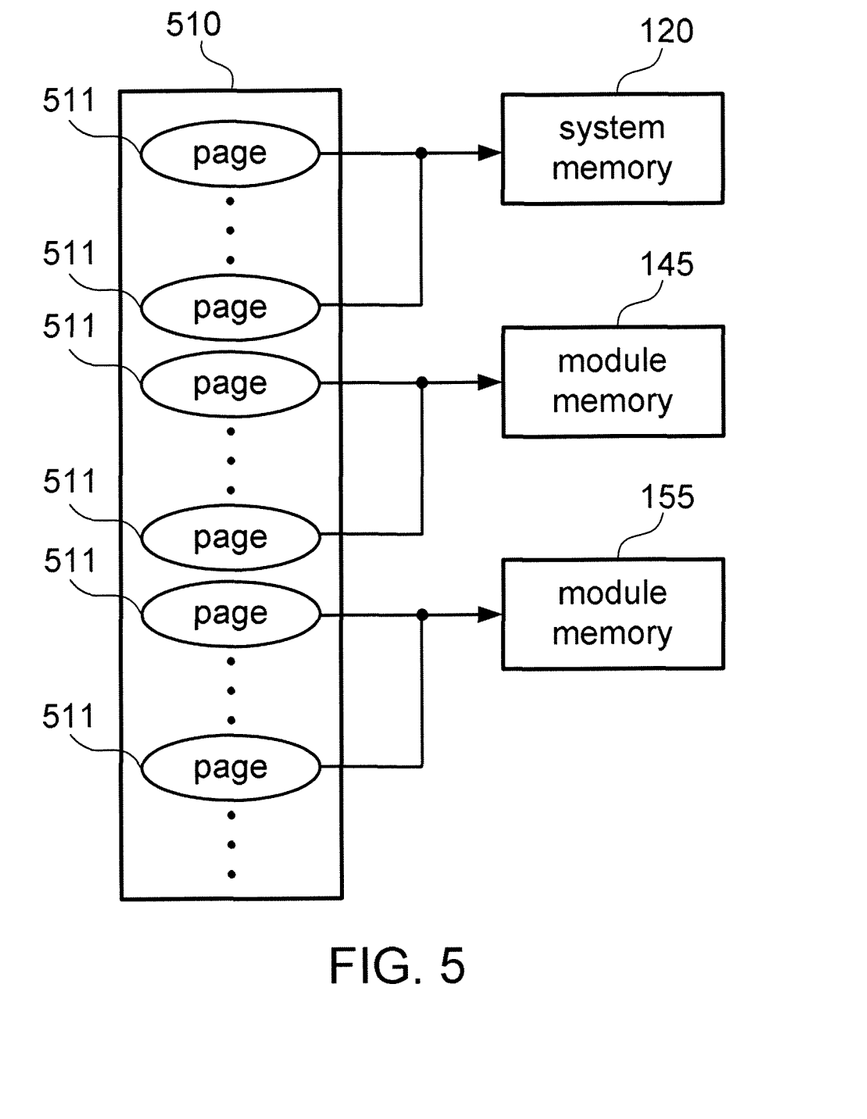
FIG. 5 is a mapping diagram of a page table and memories according to another embodiment of the present invention.

In another preferred embodiment, the RAM disk may be jointly formed by a system memory and a module memory. FIG. 4 shows a mapping diagram of a page table and memories according to another embodiment of the present invention. A page table 410 includes a plurality of pages 411. A part of the pages 411 corresponds to the system memory 120, and a part corresponds to the module memory 145. More specifically, the system memory 120 may be divided into a first block for storing program codes and data of the operating system, and a remaining second block for storing program codes and data of various processes. Only the second block may be utilized to simulate the RAM disk. Although the second block frequently becomes fragmented due to operations of the operating system (i.e., the physical addresses of available memory units become inconsecutive), a RAM disk may still be simulated from the fragmented memory units through managing the page table in the present invention. In another preferred embodiment, the RAM disk includes the system memory 120 and more than two module memories, and the system memory 120 and the module memories 145 and 155 are incorporated into one single RAM disk. The correspondence between the page table and the system memory 120 and the module memories 145 and 155 is as shown in FIG. 5. A plurality of pages 511 of the page table 510 partially correspond to the system memory 120, partially correspond to the module memory 145 and partially correspond to the module memory 155. Similarly, when the function of the embedded system 100 is switched, the processing unit 110 notifies the RAM disk driving module 130 according to working states of the function modules 140 and 150, and the RAM disk driving module 130 then updates or manages the page table 510 according to the notification. In conclusion, the RAM disk of the embedded system 100 may be formed by the system memory 120 and more than one module memory according to a ratio. For example, 40% of the RAM disk is provided by the system memory 120 and 60% is provided by the module memory 145. Alternatively, 20% of the storage space of the RAM disk is provided by the system memory 120, 50% is provided by the module memory 145, and 30% is provided by the module memory 155. Further, when the compressed data moves between any two memories, without decompressing the data, the compressed data is relocated from the source memory to the target memory. Similar to the foregoing embodiment, whether one single RAM disk is simulated from the system memory 120 and one module memory, or one single RAM disk is simulated from the system memory 120 and more than two module memories, the RAM disk driving module 130 utilizes one driver and one page table to manage the RAM disk. Further, as far as the operating system of the embedded device 100 is concerned, the RAM disk can be accessed by operating the same device file.

Figure 6:
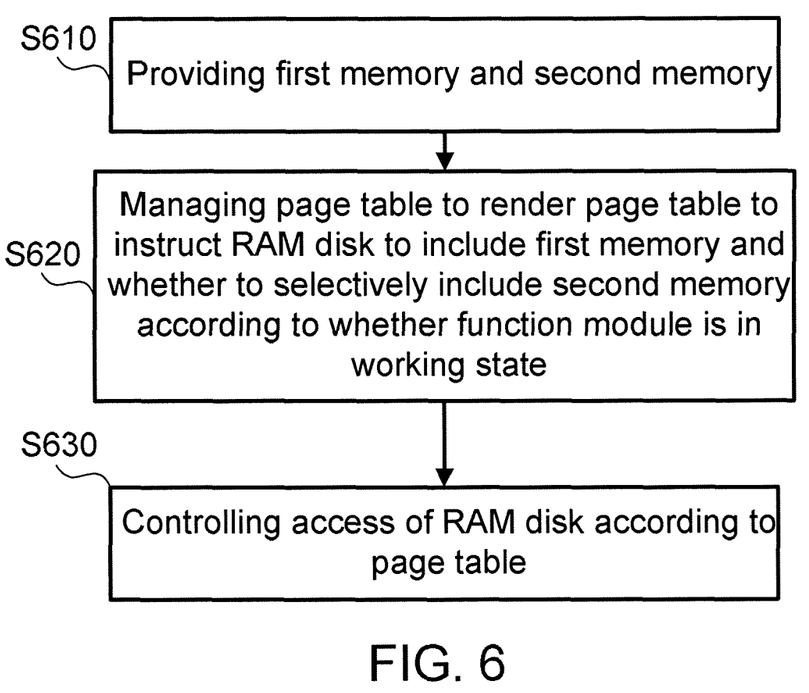
FIG. 6 is a flowchart of a method of accessing a RAM disk of an embedded device according to an embodiment of the present invention.

FIG. 6 shows a flowchart of a method of accessing a RAM disk of an embedded system according to an embodiment of the present invention. In addition to the foregoing embedded device, the present invention correspondingly discloses a method of accessing a RAM disk of an embedded device. The method is capable of simulating one single RAM disk from multiple memories (a system memory and/or module memories) and mounting the RAM disk to the operating system to be accessed by a processing unit of the embedded system. The method may be performed by the foregoing embedded system 100 or an equivalent device. As shown in FIG. 6, the method according to an embodiment of the present invention includes following steps.

In step S610, a first memory and a second memory are provided. The embedded system 100 provides a first memory and a second memory to simulate a RAM disk of the embedded device 100 from the two. The first memory may be the system memory 120 of the embedded system, or one of the module memories 145 and 155, and the second memory may be one of the module memories 145 and 155. The module memories 145 and 155 are for respectively storing program codes and data required by the function modules 140 and 150 in a working state.

In step S620, a page table is managed, such that the page table instructs the RAM disk to include the first memory, and to further selectively include the second memory according to whether the function module is in a working state. As shown in FIG. 2, the page table records the correspondence between the logical addresses and physical addresses of the RAM disk. When the function module corresponding to the module memory is in a working state, the module memory cannot be utilized to simulate the RAM disk. At this point, the pages in the page table are not supposed to point to the module memory, i.e., the RAM disk does not include the module memory. In contrast, when the function module corresponding to the module memory is in an idle state, the pages in the page table may point to the module memory such that the module memory becomes a part of the RAM disk.

In step S630, access of the RAM disk is controlled according to the page table. Different pages in the same page table may correspond to different memories. Thus, when the RAM disk is accessed according to the different pages of the same page table, the first memory and the second memory may be regarded as the same RAM disk. That is to say, the first memory and the second memory may be incorporated into one single RAM disk through the same page table, so that the operating system of the embedded device 100 deems that, instead of two RAM disks having smaller capacities, a RAM disk having a capacity equal to a capacity of the first memory and a capacity of the second memory is present. In a reading procedure, the physical address of the memory is identified according to the page table, and data is read from that address. In a writing procedure, after data is written in, the page table is updated according to a position of the written memory. More specifically, in a preferred embodiment, when the RAM disk is jointly formed by the system memory and the module memory, in the writing procedure, the module memory is prioritized to be written and the system memory is then written once the module memory is full. As such, the module memory in an idle state may better utilized to enhance the performance of the embedded system.

In continuation, when the first memory is the system memory 120, as a part of the system memory 120 stores program codes and data of the operating system, instead of incorporating the part that stores the program codes and data of the operating system to the RAM disk, only the part of memory blocks in the system memory 120 that does not store the program codes and data of the operating system is integrated to the RAM disk. Further, for either the first memory or the second memory, when the function module corresponding to that memory is in a working state, the memory is not included in the RAM disk. Conversely, when the function module corresponding to that memory is in an idle state, the memory can then be included in the RAM disk.

In addition to the above steps, the method further includes following steps. When the memory of the function module stores compressed data, and the function module enters a working state from an idle state, the compressed data in a compressed form is moved to another memory, and the page table is updated after the compressed data is moved. Details and principles of the above operates are as given in the description associated with the foregoing device of the disclosure, and shall be omitted herein. Besides, the method further includes that providing a third memory to simulate the RAM disk. At this point, the RAM disk is simulated from the system memory and two module memories. Ratios of the composition are also given in the description of the foregoing device of the disclosure, and shall be omitted herein.

Figure 7:
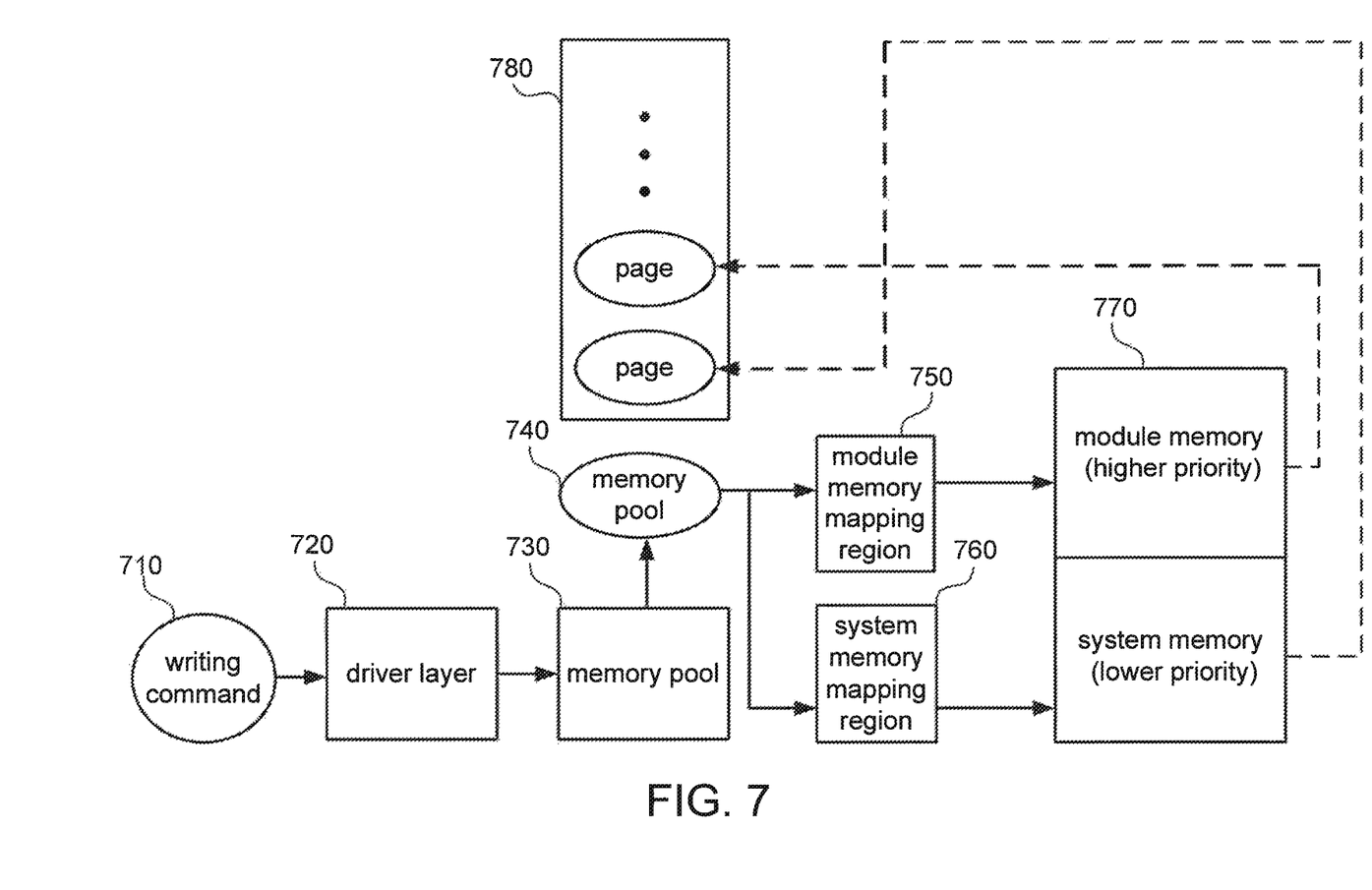
FIG. 7 is a schematic diagram of a RAM disk driving module performing a writing procedure on a RAM disk of the present invention.

FIG. 7 shows a schematic diagram of a RAM disk driving module 130 performing a writing procedure on the RAM disk of the present invention. A writing command 710 may be issued by an application currently being executed by the embedded device 100. The processing unit 110 sends the writing command 710 to the RAM disk driving module 130, and a driver layer 720 of the RAM disk driving module 130 requests a memory pool 730 for a storage space. Thus, the memory pool 730 obtains a storage space from a physical memory 770 according to the request of the driver layer 720, i.e., a memory pool 740. The size of the storage space is in a unit of one page (e.g., 4 KB). Further, when the memory pool 740 obtains the storage space of the physical memory 770, the storage space is generated by the module memory or the system memory respectively selected through a memory mapping region 750 and a system memory mapping region 760. For example, when the priority of the module memory is higher than that of the system memory, the memory pool 740 first refers to the module memory mapping region 750 to obtain the storage space. When the module memory is used up, the memory pool 740 then refers to the system memory mapping region 760 to obtain the storage space. It should be noted that, the system memory may have a priority higher than that of the module memory, or other configurations may be appropriately given according to actual requirements. For example, when the system memory is utilized below a predetermined ratio, the system memory has a higher priority; when the system memory is utilized above the predetermined ratio, the module memory then has a higher priority. When the storage space is obtained on the physical memory 770, the data to be written is written into the storage space, and the page table 780 is updated according to the position of the written physical memory. Compared to a writing procedure, a reading procedure is simpler. The reading procedure can be easily deduced by one person having ordinary skill in the art, and shall be omitted herein.

One person skilled in the art can understand implementation details and variations of the method in FIG. 6 from the disclosure of the device in FIG. 1. Without affecting full disclosure and implementation of the method of the present invention, repetitive details are omitted herein. It should be noted that, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention. In the embodiments, a smart television is given as an example that is not to be construed as a limitation to the present invention. One person skilled in the art may appropriately apply the disclosure to other types of embedded devices according to the disclosed details.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An embedded system, comprising:
   a processing unit, configured to execute an operating system;
   a first memory, for the processing unit to access required system data when the processing unit executes the operating system;
   a second memory;
   a function module, configured to perform a predetermined function
   by accessing the second memory through direct memory access (DMA) and processing required functional data stored therein when the function module performs the predetermined function; and
   a RAM disk driving module, configured to incorporate a part of the first memory with the entire second memory into a RAM disk and to control access of the RAM disk,
   wherein the first memory comprises a first memory block and a second memory block, the first memory block is configured to store the system data that the processing unit requires when executing the operating system, and the RAM disk comprises the second memory block and does not comprise the first memory block, and
   wherein the second memory block is formed by a plurality of fragmented memory blocks having inconsecutive physical addresses.

2. The embedded system according to claim 1, wherein the second memory is formed by a plurality of memory units having consecutive physical addresses.

3. The embedded system according to claim 1, further comprising:
   an another function module, configured to perform an another predetermined function; and
   a third memory, coupled to the another function module and the RAM disk driving module, for the another function module to access required another functional data through DMA when the another function module performs the another predetermined function;
   wherein, the RAM disk driving module further incorporates the third memory into the RAM disk.

4. The embedded system according to claim 1, wherein the RAM disk driving module controls the access of the RAM disk according to a page table, and according to whether the function module is in a working state, the processing unit notifies the RAM disk driving module to update the page table.

5. The embedded system according to claim 4, wherein when the function module is in the working state, the page table instructs the RAM disk to utilize a part of the first memory but not the second memory to store data; when the function module is not in the working state, the page table instructs the RAM disk to utilize a part of the first memory and the second memory to store data.

6. The embedded system according to claim 1, wherein when the second memory stores compressed data and the function module changes from an idle state to the working state, the RAM disk driving module moves the compressed data in a compressed form to the first memory.

7. A method of accessing a RAM disk of an embedded device, the embedded device comprising a function module and a processing unit configured to execute an operating system, the method comprising:
   providing a first memory for storing system data that the processor requires when executing the operating system;
   providing a second memory for the function module to access, through direct memory access (DMA), and to process functional data stored therein that the function module requires when performing a predetermined function;
   incorporating a part of the first memory with the entire second memory into a RAM disk; and
   controlling access of the RAM disk by controlling the RAM disk according to a page table, wherein the method further comprises:
   when the function module is in a working state, rendering the page table to instruct the RAM disk to comprise a part of the first memory and not to comprise the second memory; and
   when the function module is not in the working state, rendering the page table to instruct the RAM to comprise a part of the first memory and the second memory.

8. The method according to claim 7, wherein the first memory comprises a first memory block and a second memory block, the first memory block is configured to store the system data that the processing unit requires when executing the operating system, and the RAM disk comprises the second memory block and does not comprise the first memory block.

9. The method according to claim 8, wherein the second memory block is formed by a plurality of fragmented memory blocks having inconsecutive physical addresses.

10. The method according to claim 7, wherein the second memory is formed by a plurality of memory units having consecutive physical addresses.

11. The method according to claim 7, the embedded system further comprising an another function module configured to perform an another predetermined function, the method further comprising:
    providing a third memory for the another function module to access required another functional data through DMA when performing the another predetermined function; and
    incorporating the third memory into the RAM disk.

12. The method according to claim 7, further comprising:
    when the second memory stores compressed data and the function module changes from an idle state to the working state, moving the compressed data in a compressed form to the first memory.

13. A RAM disk of an embedded device, the embedded device operating an operating system, the RAM disk comprising:
    a part of a system memory, the system memory configured to store required system data when operating the operating system; and a module memory of a function module of the embedded system, the function module accessing the module memory through direct memory access (DMA) and processing data stored therein when performing a function thereof;

wherein, for the operating system, the RAM disk is one single storage device, and wherein the module memory stores compressed data, and the compressed data is moved in a compressed form to the system memory when the function module changes from an idle state to a working state.

14. The RAM disk of an embedded device according to claim 13, wherein the system memory comprises a first memory block and a second memory block, the first memory block is configured to store required system data when the operating system is operated, and RAM disk comprises the second memory block and does not comprise the first memory block.

15. The RAM disk of an embedded device according to claim 13, further comprising:

an another module memory of an another function module of the embedded device;

wherein, the another function module accesses the another module memory through DMA when performing a function thereof.

16. An embedded system, comprising:

a processing unit, configured to execute an operating system;

a first memory, for the processing unit to access required system data when the processing unit executes the operating system;

a second memory;

a function module, configured to perform a predetermined function by accessing the second memory through direct memory access (DMA) and processing required functional data stored therein when the function module performs the predetermined function; and a RAM disk driving module, configured to incorporate a part of the first memory with the entire second memory into a RAM disk and to control access of the RAM disk, wherein when the second memory stores compressed data and the function module changes from an idle state to the working state, the RAM disk driving module moves the compressed data in a compressed form to the first memory.

* * * * *